US009169420B2

(12) United States Patent
Morikami et al.

(10) Patent No.: US 9,169,420 B2
(45) Date of Patent: Oct. 27, 2015

(54) AQUEOUS POLYURETHANE RESIN DISPERSION AND COATING COMPOSITION COMPRISING THE SAME

(75) Inventors: Atsushi Morikami, Ube (JP); Masahiro Naiki, Ube (JP); Fumio Adachi, Ube (JP); Manabu Takahashi, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 14/123,039

(22) PCT Filed: May 31, 2012

(86) PCT No.: PCT/JP2012/064135
§ 371 (c)(1),
(2), (4) Date: Nov. 27, 2013

(87) PCT Pub. No.: WO2012/165569
PCT Pub. Date: Dec. 6, 2012

(65) Prior Publication Data
US 2014/0088246 A1    Mar. 27, 2014

(30) Foreign Application Priority Data

May 31, 2011    (JP) ................................. 2011-122106

(51) Int. Cl.
| C08G 18/08 | (2006.01) |
| C09D 175/04 | (2006.01) |
| C08G 18/66 | (2006.01) |
| C08G 18/75 | (2006.01) |
| C08G 18/12 | (2006.01) |
| C09D 175/06 | (2006.01) |
| C08G 18/44 | (2006.01) |

(52) U.S. Cl.
CPC .......... *C09D 175/04* (2013.01); *C08G 18/0823* (2013.01); *C08G 18/12* (2013.01); *C08G 18/44* (2013.01); *C08G 18/6659* (2013.01); *C08G 18/758* (2013.01); *C09D 175/06* (2013.01)

(58) Field of Classification Search
CPC ........... C08G 18/3225; C08G 18/3228; C08G 18/44; C08G 18/6603; C08G 18/75
See application file for complete search history.

(56) References Cited

U.S. PATENT DOCUMENTS

| 4,876,302 A | 10/1989 | Noll et al. |
| 5,859,122 A | 1/1999 | Umeya |
| 2006/0240264 A1 | 10/2006 | Gertzmann et al. |
| 2007/0083002 A1* | 4/2007 | Schafheutle et al. ......... 524/589 |
| 2007/0243149 A1 | 10/2007 | Hofacker et al. |
| 2009/0264577 A1 | 10/2009 | Blum et al. |
| 2011/0112245 A1 | 5/2011 | Nakamura et al. |
| 2013/0224376 A1 | 8/2013 | Origuchi et al. |

FOREIGN PATENT DOCUMENTS

| EP | 0 601 764 A1 | 6/1994 |
| EP | 2 281 848 A1 | 2/2011 |
| EP | 2 390 290 A1 | 11/2011 |
| EP | 2 692 807 A1 | 2/2014 |
| JP | 7-138512 A | 5/1995 |
| JP | 10-120757 A | 5/1998 |
| JP | 11-92655 A | 4/1999 |
| JP | 2001-226444 A | 8/2001 |
| JP | 2003-327895 A | 11/2003 |
| JP | 2005-15626 A | 1/2005 |
| JP | 2005-89613 A | 4/2005 |
| JP | 2005-146089 A | 6/2005 |
| JP | 2006-36909 A | 2/2006 |
| JP | 2006-36960 A | 2/2006 |
| JP | 2006-37294 A | 2/2006 |
| JP | 2007-2035 A | 1/2007 |
| JP | 2007-92195 A | 4/2007 |
| JP | 2009013226 A * | 1/2009 |
| JP | 2009-179736 A | 8/2009 |
| JP | 2010-132779 A | 6/2010 |
| JP | 2011-42896 A | 3/2011 |
| WO | WO 2009/025079 A1 | 2/2009 |
| WO | WO 2009/113412 A1 | 9/2009 |

(Continued)

OTHER PUBLICATIONS

Chinese Office Action dated Aug. 26, 2014 for Chinese Application No. 201280026234.2 with English translation.
International Search Report for PCT/JP2012/064135 mailed on Sep. 11, 2012.
Matsunaga, "Latest Polyurethane Material and Application Technique—Road to Polyurethane Production—", The Comprehensive Materials and Technology for a Novel Polyurethane Production, Sep. 30, 2005, p. 43.
International Preliminary Report on Patentability and English translation of the Written Opinion of the International Searching Authority, (Forms PCT/IB/338, PCT/IB/373 and PCT/ISA/237), dated Dec. 12, 2013, for International Application No. PCT/JP2012/064135.
Extended European Search Report, issued Oct. 24, 2014, for European Application No. 12793460.2.

*Primary Examiner* — Michael L Leonard
(74) *Attorney, Agent, or Firm* — Birch, Stewart, Kolasch & Birch, LLP

(57) ABSTRACT

The present invention is to provide an aqueous polyurethane resin dispersion in which a polyurethane resin s dispersed in an aqueous medium, wherein the polyurethane resin is obtained by reacting (A) a polyurethane prepolymer which is obtained by reacting (a) a polyisocyanate compound, (b) a polyol compound containing a polycarbonate polyol having a number average molecular weight of 800 to 3500, and (c) an acidic group-containing polyol compound, and (B) a chain extender, being dispersed in an aqueous medium, (B) the chain extender contains a polyamine compound having three or more in total of an amino group(s) and/or an imino group(s) per molecule, and the polyurethane resin has, each based on a solid content, a content of urethane bonds of 5 to 10% by weight, a content of urea bonds of 2 to 7% by weight, a content of carbonate bonds of 15 to 40% by weight, has neither ether bond nor ester bond, has a density of cross-linking points of $1.0 \times 10^{-4}$ to $1.0 \times 10^{-3}$ mol/g, an acid value of 12 to 20 mg KOH/g, and a weight average molecular weight of 100,000 or more.

20 Claims, No Drawings

(56) References Cited

FOREIGN PATENT DOCUMENTS

| WO | WO 2010/004951 A1 | 1/2010 |
| WO | WO 2010/093818 A1 | 9/2010 |
| WO | WO 2010/098317 A1 | 9/2010 |
| WO | WO 2010/118836 A2 | 10/2010 |
| WO | WO 2011/058937 A1 | 5/2011 |

* cited by examiner

AQUEOUS POLYURETHANE RESIN DISPERSION AND COATING COMPOSITION COMPRISING THE SAME

TECHNICAL FIELD

The present invention relates to an aqueous polyurethane resin dispersion in which a polyurethane resin is dispersed in an aqueous medium. The present invention also relates to a coating composition comprising the aqueous polyurethane resin dispersion and a polyurethane resin film obtained by drying the composition comprising the polyurethane resin dispersion under heating.

BACKGROUND ART

The aqueous polyurethane resin dispersion can provide a coating film having adhesiveness, wear resistance and rubbery properties, and is an environmental consideration type material which can reduce a volatile organic material as compared with the conventional solvent type polyurethane, so that it is a material that replacement from the solvent type polyurethane has been progressed.

A polycarbonate polyol is a useful compound which can become a starting material of a polyurethane resin, and a polyurethane resin having durability to be used for a rigid foam, a flexible foam, a paint, an adhesive, synthetic leather, ink binder and the like, can be produced by the reaction with an isocyanate compound. It has been stated that the characteristic feature of the polyurethane resin obtained by using the polycarbonate polyol has been produced by high cohesive force of the carbonate group, and as compared with the case where the polyether polyol or the polyester polyol is used, it is excellent in hydrolysis resistance, heat resistance, oil resistance, elastic recovery, wear resistance and weather resistance (see Non-Patent Document 1). Also, it has been known that a film obtained by an aqueous dispersion type polycarbonate polyurethane resin composition is excellent in light resistance, heat resistance, hydrolysis resistance and oil resistance (see Patent Document 1).

The present inventors have already found out that an aqueous polyurethane resin dispersion having urethane bonds, urea bonds and carbonate bonds and having a blocked isocyanato group with a specific amount can control a film preparation rate after coating, is capable of redispersing the coating film in water, and the coating film obtained by coating and heat treatment is excellent in water resistance and solvent resistance, excellent in adhesiveness to an electrodeposition film, and excellent in impact resistance since a breaking energy at tension is high (see Patent Document 2).

As a means to heighten storage stability of the aqueous polyurethane resin dispersion, it has been known a means that a three-dimensional cross-linking is introduced by the reaction of a polyfunctional amine having three or more amino groups per molecule and an isocyanate (see Patent Document 3 and Patent Document 4).

On the other hand, to the aqueous polyurethane resin dispersion, an additive such as various pigments is added in some cases. When a pigment difficulty dispersed in an aqueous medium is to be added, a non-aqueous organic solvent is generally added to the aqueous resin dispersion as a dispersant with the pigment (see Patent Document 5). However, when the non-aqueous organic solvent is added to the aqueous polyurethane resin dispersion, a viscosity of the aqueous polyurethane resin dispersion is increased, and problems such as deterioration of handling property and reduction of discharge property when spraying have occurred.

PRIOR ART DOCUMENTS

Patent Documents

[Patent Document 1] JP Hei. 10-120757A
[Patent Document 2] WO 2010/098318A
[Patent Document 3] JP 2010-132779A
[Patent Document 4] JP 2009-179736A
[Patent Document 5] JP 2003-327895A Non-Patent Documents

[Non-Patent Document 1] "Latest polyurethane material and applied technology" Published by CMC Publishing Co., Ltd., Chapter 2, p. 43

DISCLOSURE OF THE INVENTION

Problems to be Solved by the Invention

An object of the present invention is to provide an aqueous polyurethane resin dispersion in which the rate of increase in the viscosity of the aqueous polyurethane resin dispersion is low when a non-aqueous organic solvent is added thereto, and to provide a coating film excellent in water resistance and having high modulus of elasticity.

Means to Solve the Problems

The present invention has been accomplished to solve the above-mentioned problems, and specifically has the following constitutions.

[1] An aqueous polyurethane resin dispersion in which a polyurethane resin is dispersed in an aqueous medium, wherein
the polyurethane resin is obtained by reacting (A) a polyurethane prepolymer which is obtained by reacting (a) a polyisocyanate compound, (b) a polyol compound containing a polycarbonate polyol having a number average molecular weight of 800 to 3500, and (c) an acidic group-containing polyol compound, and (B) a chain extender,
(B) the chain extender contains a polyamine compound having three or more in total of an amino group(s) and/or an imino group(s) per molecule, and
the polyurethane resin has, each based on a solid content, a content of urethane bonds of 5 to 10% by weight, a content of urea bonds of 2 to 7% by weight, a content of carbonate bonds of 15 to 40% by weight, has neither ether bond nor ester bond, has a density of cross-linking points of $1.0 \times 10^{-4}$ to $1.0 \times 10^{-3}$ mol/g, an acid value of 12 to 20 mg KOH/g, and a weight average molecular weight of 100,000 or more.

[2] The aqueous polyurethane resin dispersion according to the above-mentioned [1], wherein the polyurethane resin contains an alicyclic structure, and a content of the alicyclic structure is 10 to 40% by weight based on a solid content.

[3] The aqueous polyurethane resin dispersion according to the above-mentioned [1] or [2], wherein (a) the polyisocyanate compound is a polyisocyanate compound having no allophanate bond.

[4] The aqueous polyurethane resin dispersion according to any one of the above-mentioned [1] to [3], wherein (a) the polyisocyanate compound contains an alicyclic diisocyanate.

[5] The aqueous polyurethane resin dispersion according to any one of the above-mentioned [1] to [4], wherein (a) the polyisocyanate compound contains 80 mol % or more of 4,4'-dicyclohexylmethane diisocyanate.

[6] The aqueous polyurethane resin dispersion according to any one of the above-mentioned [1] to [5], wherein (B) the chain extender contains a polyamine compound having two $NH_2$ groups and one or more NH groups per molecule.

[7] The aqueous polyurethane resin dispersion according to any one of the above-mentioned [1] to [6], wherein (b) the polyol compound contains a polyfunctional alcohol having three or more hydroxyl groups per molecule in an amount of 10 mol % or more and less than 50 mol %.

[8] The aqueous polyurethane resin dispersion according to any one of the above-mentioned [1] to [7], wherein the dispersion can be obtained by subjecting the reaction of (A) the polyurethane prepolymer and (B) the chain extender in the presence of a polyfunctional isocyanate compound having three or more isocyanato groups per molecule.

[9] A coating composition comprising the aqueous polyurethane resin dispersion according to any one of the above-mentioned [1] to [8].

[10] A coating composition according to the above-mentioned [9], wherein the composition further comprises a non-aqueous organic solvent.

[11] A polyurethane resin film obtained by applying a composition comprising the aqueous polyurethane resin dispersion according to any one of the above-mentioned [1] to [8] to a substrate, and drying under heating.

Effects of the Invention

The aqueous polyurethane resin dispersion of the present invention is good in handling property and storage stability since the rate of increase in the viscosity of the aqueous polyurethane resin dispersion is low when a non-aqueous organic solvent is added thereto. Also, a coating film obtained by the coating composition comprising the aqueous polyurethane resin dispersion of the present invention shows high modulus of elasticity, and even when it is before the completely drying (it is the state when a laminate of a substrate and a coating film is upright, the coating film does not sag, for example, a concentration of the solid content of the coating film is about 60 to 95% by weight), a swelling rate and a dissolution rate to water are low (that is, excellent in water resistance), and further it can be coated with the other aqueous coating agent to obtain a multi-layered coating film and can be dried under heating simultaneously so that it is excellent in the point of working efficiency.

BEST MODE TO CARRY OUT THE INVENTION

[(a) Polyisocyanate Compound]

The (a) polyisocyanate compound in the present invention is not particularly limited so long as it is a polyisocyanate compound having neither ether bond nor ester bond, and preferably a diisocyanate compound having two isocyanato groups per molecule.

More specifically, there may be mentioned an aromatic polyisocyanate compound such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane and 1,5-naphthylene diisocyanate; an aliphatic polyisocyanate compound such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate and bis(2-isocyanatoethyl)carbonate; an alicyclic polyisocyanate compound such as isophorone diisocyanate (IPDI), 4,4'-dicyclohexylmethane diisocyanate (hydrogenated MDI), cyclohexylene diisocyanate, methylcyclohexylene diisocyanate (hydrogenated TDI), 2,5-norbornane diisocyanate and 2,6-norbornane diisocyanate, and the like. These polyisocyanate compounds may be used alone, or used in combination.

Among (a) the polyisocyanate compounds, a polyisocyanate compound having no allophanate bond is preferred. If (a) the polyisocyanate compound contains a polyisocyanate having an allophanate bond, tensile strength, elongation at break, breaking energy and the like of the coating film or the film obtained from the aqueous polyurethane resin dispersion of the present invention tend to be lowered, and impact resistance or tensile characteristics of the coating film or the film tend to be lowered.

Among (a) the polyisocyanate compounds, an alicyclic polyisocyanate compound is preferred. By using the alicyclic polyisocyanate compound, a coating film difficultly yellowing can be obtained, and the hardness of the coating film tends to be high. The alicyclic polyisocyanate compound is preferably an alicyclic diisocyanate compound. Among these, 4,4'-dicyclohexylmethane diisocyanate (hydrogenated MDT) is used as an essential component, and a proportion thereof in (a) the polyisocyanate compound is preferably 80 mol % or more, further preferably 90 mol % or more in the viewpoints of controlling the reactivity and the modulus of elasticity of the resulting coating film being high.

[(b) Polyol Compound]

The (b) polyol compound in the present invention is (b-1) a polyol compound containing a polycarbonate polyol having a number average molecular weight of 800 to 3500.

[(b-1) Polycarbonate Polyol Having a Number Average Molecular Weight of 800 to 3500]

The polycarbonate polyol having a number average molecular weight of 800 to 3500 in the present invention is not particularly limited so long as it has a number average molecular weight of 800 to 3500. If the number average molecular weight of the polycarbonate polyol is less than 800, the breaking energy at tension of the resulting coating film is sometimes low. If the number average molecular weight of the polycarbonate polyol exceeds 3500, water resistance of a coating film (before completion of drying: it is the state when a laminate of a substrate and a coating film is upright, the coating film does not sag, for example, a concentration of the solid content of the coating film is about 60 to 95% by weight) formed by using the resulting aqueous polyurethane resin dispersion is sometimes poor. The number average molecular weight is more preferably 1000 to 2500, and a polycarbonate dial in which the number of the hydroxyl groups per molecule is two is preferred in the viewpoints of breaking energy at tension and water resistance.

The polycarbonate polyol which can be used may be mentioned a polycarbonate polyol prepared by the general preparation method such as the interesterification method of a polyol and a carbonic acid ester and the phosgene method. A proportion of (b-1) the polycarbonate polyol having a number average molecular weight of 800 to 3500 in (b) the polyol compound is preferably 50 to 100 mol %, more preferably 50 to 90 mol %, and particularly preferably 80 to 90 mol % in the viewpoints of the breaking energy at tension of the coating film to be formed. In the present invention, the number average molecular weight (Mn) of the polycarbonate polyol can be calculated from the hydroxyl value by the following formula.

$$Mn=(56100\times valence)/\text{the hydroxyl value}$$

In the formula, the valence is the number of the hydroxyl group per molecule, and the hydroxyl value is measured in accordance with the method B of JIS K 1557. When the polycarbonate polyol is a polycarbonate diol, the valence is 2.

The polyol which can become a starting material of the polycarbonate polyol may be mentioned an aliphatic diol such as ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and 1,3-butanediol, 3-methylpentane-1,5-dial, 2-ethylhexane-1,6-dial, 2-methyl-1,3-pentanediol, neopentylgylcol, 2-methyl-1,8-octanediol; an alicyclic diol such as 1,3-cyclohexanediol, 1,4-cyclohexanediol, 2,2'-bis(4-hydroxycyclohexyl)propane, 1,4-cyclohexanedimethanol; an aromatic diol such as 1,4-benzenedimethanol; a polyfunctional polyol such as trimethylolpropane, pentaerythritol and the like. The polyol may be used alone or in combination for preparing the polycarbonate polyol. The polycarbonate polyol is preferably a polycarbonate polyol obtained from the aliphatic diol or an alicyclic dial, more preferably a polycarbonate polyol obtained from the aliphatic diol, particularly preferably a polycarbonate polyol obtained from 1,6-hexanediol.

In the present invention, when the polycarbonate polyol having neither ether bond nor ester bond is used, an aqueous polyurethane resin having neither ether bond nor ester bond can be formed. According to this procedure, water resistance of a coating film (before completion of drying: it is the state when a laminate of a substrate and a coating film is upright, the coating film does not sag, for example, a concentration of the solid content of the coating film is about 60 to 95% by weight) formed by using the aqueous polyurethane resin dispersion can be made good.

[(b-2) Polyfunctional Alcohol Having Three or More Hydroxyl Groups Per Molecule]

In the present invention, (b) the polyol compound preferably contains, in addition to (b-1) the polycarbonate polyol having a number average molecular weight of 800 to 3500, (b-2) a polyfunctional alcohol having three or more hydroxyl groups per molecule. By using the polyfunctional alcohol, a cross-linking structure is introduced into (A) the polyurethane prepolymer, so that dispersibility of the polyurethane resin in water becomes good. The (b-2) polyfunctional alcohol having three or more hydroxyl groups per molecule may be mentioned, for example, a triol compound such as trimethylolethane, trimethylolpropane and a tetraol compound such as pentaerythritol. The (b-2) polyfunctional alcohol having three or more hydroxyl groups per molecule is preferably contained in (b) the polyol compound in an amount of less than 50% in terms of a molar basis, more preferably 10 to 50%, particularly preferably 10 to 20%. If (b-2) the polyfunctional alcohol is contained in (b) the polyol in an amount of 10 mol % or more, a cross-linking structure is introduced into (A) the polyurethane prepolymer, so that storage stability of the aqueous polyurethane resin dispersion in the co-presence of a non-aqueous organic solvent becomes good, and water resistance of a coating film (before completion of drying: it is the state when a laminate of a substrate and a coating film is upright, the coating film does not sag, for example, a concentration of the solid content of the coating film is about 60 to 95% by weight) formed by using the aqueous polyurethane resin dispersion becomes also good. Also, if (b-2) the polyfunctional alcohol is contained in (b) the polyol in an amount of 50 mol % or more, breaking energy of the coating film becomes low so that impact resistance sometimes becomes low.

In the present invention, by using (b-2) the polyfunctional alcohol having neither ether bond nor ester bond, an aqueous polyurethane resin dispersion having neither ether bond nor ester bond can be prepared. According to this procedure, water resistance of a coating film (before completion of drying: it is the state when a laminate of a substrate and a coating film is upright, the coating film does not sag, for example, a concentration of the solid content of the coating film is about 60 to 95% by weight) formed by using the aqueous polyurethane resin dispersion becomes good.

[(b-3) Other Polyol Compound]

In the present invention, in (b) the polyol compound, in addition to (b-1) the polycarbonate polyol having a number average molecular weight of 800 to 3500, (b-3) the other polyol compound may be mixed. The (b-3) other polyol compound is different from (b-1) the polycarbonate polyol having a number average molecular weight of 800 to 3500 and (b-2) the polyfunctional polyol having three or more hydroxyl groups per molecule, and is a polyol compound having neither ether bond nor ester bond. When (b-3) the other polyol compound is used in combination, a proportion thereof in all (b) the polyol compound is preferably less than 20 mol %, more preferably 0 to 10 mol %, and particularly preferably 0 to 5 mol %. The (b-3) other polyol compound is not particularly limited, and may be mentioned, for example, a polycarbonate polyol other than the polycarbonate polyol having a number average molecular weight of 800 to 3500, an aliphatic diol, an alicyclic diol, an aromatic diol, and the like. These polyol compounds can be used for heightening breaking energy at tension or water resistance of a coating film (before completion of drying: it is the state when a laminate of a substrate and a coating film is upright, the coating film does not sag, for example, a concentration of the solid content of the coating film is about 60 to 95% by weight). Here, in (b-3) the other polyol compound, (c) an acidic group-containing polyol compound described in the next item is not included.

In the present invention, as (b-3) the other polyol compound, that having neither ether bond nor ester bond is used so that the polyurethane resin of the resulting aqueous polyurethane resin dispersion shall contain neither ether bond nor ester bond. According to this procedure, a coating film (before completion of drying: it is the state when a laminate of a substrate and a coating film is upright, the coating film does not sag, for example, a concentration of the solid content of the coating film is about 60 to 95% by weight) formed by using the aqueous polyurethane resin dispersion with good water resistance can be obtained.

[(c) An Acidic Group-Containing Polyol Compound]

The (c) acidic group-containing polyol compound in the present invention is not particularly limited so long as it is a compound having two or more hydroxyl groups and one or more acidic groups per molecule. The acidic group may be mentioned a carboxyl group, a sulfo group, a phospho group, a phenolic hydroxyl group or the like. More specifically, there may be mentioned a 2,2-dimethylolalkanoic acid such as 2,2-dimethylolpropionic acid and 2,2-dimethylolbutanoic acid, and N,N-bishydroxyethylglycine, N,N-bishydroxyethylalanine, 3,4-dihydroxybutanesulfonic acid, 3,6-dihydroxy-2-toluenesulfonic acid, and the like. These may be used alone, or used a plural kind in combination. Among the acidic group-containing polyol compound, 2,2-dimethylolpropionic acid is preferred in the viewpoint of easily available.

In the present invention, as (c) the acidic group-containing polyol compound, that having neither ether bond nor ester bond is used, so that the polyurethane resin of the resulting aqueous polyurethane resin dispersion shall contain neither ether bond nor ester bond. According to this procedure, a coating film (before completion of drying: it is the state when a laminate of a substrate and a coating film is upright, the coating film does not sag, for example, a concentration of the solid content of the coating film is about 60 to 95% by weight) formed by using the aqueous polyurethane dispersion becomes a material having better water resistance,

[(A) Polyurethane Prepolymer]

The (A) polyurethane prepolymer in the present invention may be a polyurethane prepolymer obtained by reacting at least (a) the polyisocyanate compound, (b) the polyol compound and (c) the acidic group-containing polyol compound. A preparation method of the polyurethane prepolymer is not particularly limited, and may be mentioned a method that, for example, (a) the polyisocyanate compound, (b) the polyol compound and (c) the acidic group-containing polyol compound are reacted in the presence or absence of a urethanization catalyst to synthesize (A) a polyurethane prepolymer.

The urethanization catalyst is not particularly limited, and may be mentioned, for example, a salt of a metal and an organic or inorganic acid such as a tin catalyst (trimethyl tin laurate, dibutyl tin dilaurate, etc.) or a lead series catalyst (lead octylate, etc.), an organic metal derivative, an amine catalyst (triethylamine, N-ethylmorpholine, triethylenediamine, etc.), a diazabicycloundecene catalyst, and the like. Among these, dibutyl tin dilaurate is preferred in the viewpoint of reactivity.

Amounts of (a), (b) and (c) to be used are preferably as follows. An amount of (b) to be used is preferably 0.1 to 0.5-fold in molar basis based on an amount of (a), more preferably 0.15 to 0.45-fold, and 0.2 to 0.4-fold is particularly preferred. An amount of (c) to be used is preferably 0.3 to 2.0-fold in molar basis based on an amount of (b), more preferably 0.4 to 1.6-fold, and 0.5 to 1.3-fold is particularly preferred.

[(B) Chain Extender]

The (B) chain extender in the present invention is required to contain at least one (B-1) polyamine compound having three or more in total of an amino group(s) and/or an imino group(s) per molecule. As an optional component, (B) the chain extender may contain (B-2) other chain extender. However, when a polyurethane resin is prepared, it is necessary to have a density of cross-linking points in the range of $1.0 \times 10^{-4}$ to $1.0 \times 10^{-3}$ mol/g. If the density of the cross-linking points is less than $1.0 \times 10^{-4}$ mol/g, the viscosity tends to be increased when a non-aqueous organic solvent is added, and storage stability becomes insufficient. Further, a swelling rate of the coating film (before completion of drying: it is the state when a laminate of a substrate and a coating film is upright, the coating film does not sag, for example, a concentration of the solid content of the coating film is about 60 to 95% by weight) to an aqueous washing solution becomes small, and it becomes difficult to carry out repainting. If the density of the cross-linking points exceeds $1.0 \times 10^{-3}$ mol/g, elongation at the breaking point at tension becomes small, and a coating film which is weak to impact can only be obtained.

A proportion of (B-1) the polyamine compound having three or more in total of an amino group(s) and/or an imino group(s) per molecule in (B) the chain extender is preferably 10 to 100 mol %, more preferably 50 to 100 mol %.

The (B-1) polyamine compound having three or more in total of an amino group(s) and/or an imino group(s) per molecule is not particularly limited so long as it is a polyamine compound having neither ether bond nor ester bond, and may be mentioned, for example, a triamine compound such as diethylenetriamine, bis(2-aminopropyl)amine, bis(3-aminopropyl)amine; a tetramine compound such as triethylenetetramine, tripropylenetetramine, N-(benzyl)triethylenetetramine, N,N'''-(dibenzyl)triethylenetetramine, N-(benzyl)-N'''-(2-ethylhexyl)triethylenetetramine; a pentamine compound such as tetraethylenepentamine, tetrapropylenepentamine; a hexamine compound such as pentaethylenehexamine, pentapropylenehexamine; and a polyamine such as polyethyleneimine, polypropyleneimine, and the like. Among these, in the viewpoint of reactivity with the polyurethane prepolymer, preferred are a polyamine having two amino groups and one or more imino groups such as diethylenetriamine, triethylenetetramine, bis(2-aminopropyl)amine, bis(3-aminopropyl)amine, tripropylenetetramine, tetraethylenepentamine, tetrapropylenepentamine, pentaethylenehexamine, pentapropylenehexamine, or a mixture thereof.

The (B-2) other chain extender is not particularly limited so long as it is a compound having neither ether bond nor ester bond, and may be mentioned, for example, a diamine compound such as hydrazine, ethylenediamine, 1,4-tetramethylenediamine, 2-methyl-1,5-pentanediamine, 1,6-hexamethylenediamine, 1,4-hexamethylenediamine, 3-aminomethyl-3,5,5-trimethylcyclohexyl amine, 1,3-bis(aminomethyl)cyclohexane, xylylenediamine, piperazine, 2,5-dimethylpiperazine, a polyol compound such as 1,4-butanediol, 1,6-hexanediol, water, and the like, and above all, a primary diamine compound is preferably mentioned. These may be used alone, or used in combination.

An amount of (B) the chain extender to be added is preferably an equivalent amount or less of a residual isocyanato group which becomes a starting point of chain extension in (A) the urethane prepolymer, more preferably 0.7 to 0.99 equivalent of a residual isocyanato group. If the chain extender is added exceeding the equivalent amount of the residual isocyanato group, a molecular weight of the chain extended urethane polymer is lowered in some cases, and strength of a coating film formed by using the obtained aqueous polyurethane resin dispersion is lowered in some cases.

In the present invention, as (B) the chain extender, that having neither ether bond nor ester bond is used, so that the polyurethane resin of the resulting aqueous polyurethane resin dispersion shall contain neither ether bond nor ester bond, and good water resistance can be obtained for a coating film (before completion of drying: it is the state when a laminate of a substrate and a coating film is upright, the coating film does not sag, for example, a concentration of the solid content of the coating film is about 60 to 95% by weight) formed by using the aqueous polyurethane dispersion.

[Aqueous Polyurethane Resin Dispersion]

The preparation method of the aqueous polyurethane resin dispersion of the present invention is not particularly limited, and, for example, it contains the following steps:

a step of obtaining (A) a polyurethane prepolymer by reacting (a) the polyisocyanate compound, (b) the polyol compound and (c) the acidic group-containing polyol compound;

a step of neutralizing the acidic group in the polyurethane prepolymer;

a step of dispersing the polyurethane prepolymer in an aqueous medium; and a step of obtaining an aqueous polyurethane resin dispersion by reacting (B) the chain extender with the polyurethane prepolymer.

Incidentally, in the preparation method, addition of the chain extender may be after dispersing the polyurethane prepolymer in an aqueous medium, or may be during the dispersion. Also, the above respective steps may be carried out under an inert gas atmosphere or may be carried out in the atmosphere.

In the viewpoint of storage stability of the aqueous polyurethane resin dispersion in the co-presence of a non-aqueous organic solvent, it is preferred to prepare an aqueous polyurethane resin dispersion by the method comprising the following mentioned steps:

a step of reacting (a) the polyisocyanate compound, (b) the polyol compound and (c) the acidic group-containing polyol compound to obtain (A) a polyurethane prepolymer;

a step of neutralizing the acidic group in the polyurethane prepolymer;

a step of adding (X) a polyfunctional isocyanate compound having three or more isocyanato groups per molecule and mixing the mixture;

a step of dispersing the mixture of (A) the polyurethane prepolymer and (X) the polyfunctional isocyanate in an aqueous medium; and a step of reacting (B) a chain extender to obtain an aqueous polyurethane resin dispersion.

The aqueous polyurethane resin dispersion prepared by the method has good storage stability in the co-presence of a non-aqueous organic solvent, water resistance of the obtained coating film (before completion of drying: it is the state when a laminate of a substrate and a coating film is upright, the coating film does not sag, for example, a concentration of the solid content of the coating film is about 60 to 95% by weight) is good.

The neutralizing agent may be mentioned, for example, organic amines such as trimethylamine, triethylamine, tri-n-propylamine, tributylamine, triethanolamine, aminomethylpropanol, aminomethylpropanediol, aminoethylpropanediol, trihydroxymethylaminomethane, monoethanolamine, triisopropanolamine, for example, an inorganic alkali salt such as potassium hydroxide, sodium hydroxide, and further, ammonia, and the like. These may be used alone, or used in combination. Among the neutralizing agent, organic amines are preferred in the viewpoint of workability, and triethylamine is more preferred. An amount of the neutralizing agent to be added is, for example, 0.4 to 1.2 equivalent, preferably, 0.6 to 1.0 equivalent per 1 equivalent of the acidic group.

The aqueous medium may be mentioned water or a mixed medium of water and a hydrophilic organic solvent, or the like. The water may be mentioned, for example, tap water, deionized water, distilled water, ultrapure water, and the like, and in consideration of easiness in obtaining the material or instability of the particles due to the effect of a salt, deionized water is preferably mentioned. The hydrophilic organic solvent may be mentioned, a lower monovalent alcohol such as methanol, ethanol, propanol; a polyvalent alcohol such as ethylene glycol, glycerin; an aprotic hydrophilic organic solvent such as N-methylmorpholine, dimethylsulfoxide, dimethylformamide, N-methylpyrrolidone, N-ethylpyrrolidone, and the like. An amount of the hydrophilic organic solvent in the aqueous medium is preferably 0 to 20% by weight.

The (X) polyfunctional isocyanate may be mentioned an isocyanurate material which is a trimer of 1,6-hexanediisocyanate, an isocyanurate material which is a trimer of isophoronediisocyanate, an isocyanurate material which is a trimer of tolylene diisocyanate, and an isocyanurate material obtained from four molecule of tolylene diisocyanate and one molecule of 1,6-hexane diisocyanate, and the like. A molar number of the isocyanato group of the (X) polyfunctional isocyanate is preferably 20 mol % or less of the residual isocyanato group of the (A) polyurethane prepolymer, more preferably 1 to 15 mol %, and particularly preferably 3 to 10 mol %. If the isocyanato group of the (X) polyfunctional isocyanate exceeds 20 mol % of the isocyanato group of the (A) polyurethane prepolymer, a breaking energy at tension of the coating film becomes small, and it becomes weak to impact.

The aqueous polyurethane resin dispersion of the present invention is required to be a content of the urethane bonds in the aqueous polyurethane resin dispersion of 5 to 10% by weight based on a solid content, and a content of the urea bonds of the same to be 2 to 7% by weight based on a solid content. If the contents of the urethane bonds and the urea bonds are too little, there are problems in that a coating film cannot be formed and the surface of the coating film is sticky after drying, etc. In addition, if the contents of the urethane bonds and the urea bonds are too much, when the aqueous polyurethane resin dispersion is applied to a substrate, a swelling rate of a coating film (before completion of drying: it is the state when a laminate of a substrate and a coating film is upright, the coating film does not sag, for example, a concentration of the solid content of the coating film is about 60 to 95% by weight) to an aqueous washing solution is lowered so that removal thereof becomes difficult, and it becomes difficult to carry out repainting in some cases. A content of the urethane bonds is preferably 6 to 9% by weight, more preferably 6 to 8% by weight in the points of breaking energy at tension and a swelling rate to such an aqueous washing solution, and a content of the urea bonds is preferably 3 to 6% by weight, more preferably 3.5 to 5.5% by weight in the points of a water swelling rate of a coating film (before completion of drying: it is the state when a laminate of a substrate and a coating film is upright, the coating film does not sag, for example, a concentration of the solid content of the coating film is about 60 to 95% by weight) and storage stability under the co-presence of a non-aqueous organic solvent.

The aqueous polyurethane resin dispersion of the present invention is required to be a content of the carbonate bonds of the polyurethane resin in the dispersion of 15 to 40% by weight based on a solid content, more preferably 18 to 35% by weight, particularly preferably 20 to 30% by weight. If the content of the carbonate bonds is too little, there are problems in that elongation at break of the resulting coating film is small, and a coating film which is weak to impact can only be obtained. Also, if the content of the carbonate bonds is too much, there are problems in that a coating film cannot be formed and the surface of the coating film is sticky after drying, etc.

The aqueous polyurethane resin dispersion of the present invention is required to be contents of the ether bond and the ester bond in the polyurethane resin in the dispersion of 0% by weight based on a solid content. That is, the polyurethane resin has neither ether bond nor ester bond. If either the ether bond or the ester bond are present in the polyurethane resin, water resistance of the resulting coating film (before completion of drying: it is the state when a laminate of a substrate and a coating film is upright, the coating film does not sag, for example, a concentration of the solid content of the coating film is about 60 to 95% by weight) is lowered, so that there causes a problem in that the layers are mixed when a multi-layered coating film is formed, etc.

A weight average molecular weight of the polyurethane resin in the aqueous polyurethane resin dispersion is required to be 100,000 or more, more preferably 150,000 or more, particularly preferably 200,000 or more. If the weight average molecular weight of the polyurethane resin is less than 100,000, tensile strength of the resulting coating film becomes small, and it becomes a coating film weak to impact. Further, a swelling rate of the coating film (before completion of drying: it is the state when a laminate of a substrate and a coating film is upright, the coating film does not sag, for example, a concentration of the solid content of the coating film is about 60 to 95% by weight) to water becomes high. Incidentally, in the present invention, the weight average molecular weight is measured by gel permeation chromatography (GPC), and is a conversion value calculated from a calibration curve provisionally prepared by using the standard polystyrenes.

An acid value of the polyurethane resin in the aqueous polyurethane resin dispersion is required to be 12 to 20 mg KOH/g based on a solid content, more preferably 12 to 18 mg KOH/g, particularly preferably 13 to 16 mg KOH/g. If the acid value of the polyurethane resin exceeds 20 mg KOH/g, a water swelling rate of the coating film (before completion of drying: it is the state when a laminate of a substrate and a coating film is upright, the coating film does not sag, for example, a concentration of the solid content of the coating film is about 60 to 95% by weight) becomes high, while if it is less than 12 mg KOH/g, dispersibility in an aqueous medium tends to be lowered. The acid value can be measured in accordance with the indicator titration method of JIS K 1557. However, the measurement is to be carried out by removing the neutralizing agent used for neutralizing an acidic group. For example, when an organic amine is used as the neutralizing agent, the aqueous polyurethane resin dispersion is applied onto a glass plate, dried at a temperature of 60° C. and under a reduced pressure of 20 mmHg for 24 hours, and the resulting coating film is dissolved in N-methylpyrrolidone (NMP), and the acid value can be measured in accordance with the indicator titration method of JIS K 1557.

A content of the alicyclic structure in the aqueous polyurethane resin dispersion is not particularly limited, and preferably 10 to 40% by weight based on a solid content, more preferably 12 to 30% by weight, particularly preferably 12 to 25% by weight. If the content of the alicyclic structure in the aqueous polyurethane resin dispersion is too little, modulus of elasticity of the resulting coating film is lowered in some cases, and hardness of the coating film is lowered in some cases. Also, if the content of the alicyclic structure in the aqueous polyurethane resin dispersion is too much, when the resulting aqueous polyurethane resin dispersion is applied onto the substrate, a swelling rate of the coating film (before completion of drying: it is the state when a laminate of a substrate and a coating film is upright, the coating film does not sag, for example, a concentration of the solid content of the coating film is about 60 to 95% by weight) to an aqueous washing solution is lowered so that removal thereof becomes difficult, and it becomes difficult to carry out repainting in some cases.

[Coating Composition]

The coating composition of the present invention may be used the aqueous polyurethane resin dispersion as such or may be used by adding various kinds of additives. The additive may be mentioned a plasticizer, a defoaming agent, a leveling agent, an antiseptic agent, a rust-preventive agent, a delustering agent, a flame retardant, a tackifier, a thixotropic agent, a lubricant, an antistatic agent, a viscosity-reducing agent, a thickening agent, a diluting agent, a pigment, a dye, a UV absorber, a photostabilizer, an antioxidant, a filler, and the like. The coating composition of the present invention may be applied onto various substrates such as a metal, ceramic, a synthetic resin, non-woven fabric, woven fabric, knitted cloth, paper.

(Non-Aqueous Organic Solvent)

In addition, a non-aqueous organic solvent may be used in the coating composition of the present invention as a dispersant of the additive. The non-aqueous organic solvent may be mentioned, for example, an alkyl ester such as ethyl acetate, n-butyl acetate, isobutyl acetate, sec-butyl acetate, n-propyl acetate, isopropyl acetate, n-hexyl acetate, benzyl acetate, ethyl propionate, n-propyl propionate, isopropyl propionate, n-butyl propionate, isobutyl propionate, sec-butyl propionate, a ketone such as methyl n-butyl ketone, methyl isobutyl ketone, 2-heptanone, diethyl ketone, di-n-propyl ketone, di-n-butyl ketone, an ether such as di-n-propyl ether, diisopropyl ether, di-n-butyl ether, anisole, an aromatic such as toluene, xylene, chlorobenzene, an alcohol such as 1-hexanol, 1-heptanol, 2-ethylhexanol, an aliphatic such as n-butyl chloride, chloroform, hexane, octane. The rate of increase in the viscosity of the aqueous polyurethane resin dispersion of the present invention is low when a non-aqueous organic solvent is added, so that the coating composition of the present invention has good handling property and storage stability even in the co-presence of a non-aqueous organic solvent. In particular, when the non-aqueous organic solvent is an alcohol having 6 or more carbon atoms, the rate of increase in the viscosity of the aqueous polyurethane resin dispersion of the present invention is low.

[Polyurethane Resin Film]

The polyurethane resin film of the present invention can be prepared by, for example, applying a composition comprising the aqueous polyurethane resin dispersion onto a substrate, and drying under heating. As the composition comprising the aqueous polyurethane resin dispersion, the aqueous polyurethane resin dispersion may be used as such, or various kinds of additives may be added to the aqueous polyurethane resin dispersion. The additives may be mentioned a plasticizer, a defoaming agent, a leveling agent, an antiseptic agent, a rust-preventive agent, a delustering agent, a flame retardant, a tackifier, a thixotropic agent, a lubricant, an antistatic agent, a viscosity-reducing agent, a thickening agent, a diluting agent, a pigment, a dye, a UV absorber, a photostabilizer, an antioxidant, a filler, a non-aqueous organic solvent, and the like.

A method for preparing the a polyurethane resin film is not particularly limited, and may be mentioned, for example, a method in which the above-mentioned aqueous polyurethane resin dispersion is applied onto a releasable substrate by using various kinds of coating devices, dried, and the releasable substrate and the polyurethane resin film are peeled off.

The releasable substrate is not particularly limited, and may be mentioned, for example, a glass substrate, a plastic substrate such as polyethylene terephthalate and polytetrafluoroethylene, a metal substrate, and the like. The surface of the above respective substrates may be subjected to the treatment by a releasing agent. The coating device is not particularly limited, and may be mentioned, for example, a bar coater, a roll coater, a gravure roll coater, an air spray, and the like.

A thickness of the polyurethane resin film of the present invention is not particularly limited, and preferably 0.01 to 0.5 mm.

EXAMPLES

Next, the present invention is explained in more detail by referring to Examples and Comparative examples.

Incidentally, measurements of the physical properties are carried out as follows.

(1) Hydroxyl value: It was measured according to the method B of JIS K 1557.

(2) Content of free isocyanato group: 0.5 g of the reaction mixture of the polyurethane prepolymer after completion of the urethanization reaction was sampled and added to a mixed solution of 10 mL of 0.1 mol/L (liter) dibutyl amine-tetrahydrofuran (THF) solution and 20 mL of THF, and unconsumed dibutyl amine was titrated by 0.1 mol/L of hydrochloric acid. From the difference between the titrated value and a blank experiment, a molar concentration of an isocyanato group remained in the reaction mixture was calculated. The molar concentration was converted into a weight fraction of the isocyanato group to make it as a content of a free isocyanato group. Incidentally, the indicator used for the titration is bromophenol blue.

(3) Contents of urethane bonds based on a solid content and urea bonds based on a solid content: From the feed ratio of the respective starting materials of the aqueous polyurethane resin dispersion, molar concentrations (mol/g) of the urethane bonds and the urea bonds were calculated, and those converted into the weight fractions were showed. The weight fraction is based on the solid content of the aqueous polyurethane resin dispersion. 0.3 g of the aqueous polyurethane resin dispersion was applied to a glass plate with a thickness of 0.2 mm and dried under heating at 140° C. for 4 hours, and the weight of the remained material was measured. This value was divided by the weight before drying and the resulting value was made a solid content concentration. The product of the total weight of the aqueous polyurethane resin dispersion and the solid content concentration was made a solid content weight, and the weight fraction was calculated.

(4) Content of carbonate bonds based on a solid content: From the feed ratio of the respective starting materials of the aqueous polyurethane resin dispersion, a molar concentration (mol/g) of the carbonate bonds was calculated, and that converted into the weight fraction was showed. The weight fraction is based on the solid content of the aqueous polyurethane resin dispersion, and calculated by the same method as in the content of the urethane bonds based on a solid content.

(5) Content of ether bonds based on a solid content and content of ester bonds based on a solid content: From the feed ratio of the respective starting materials of the aqueous polyurethane resin dispersion, molar concentrations (mol/g) of the ether bond and the ester bond were calculated, and those converted into the weight fractions were showed. The weight fraction is based on the solid content of the aqueous polyurethane resin dispersion, and calculated by the same method as in the content of the urethane bonds based on a solid content.

(6) Content of the alicyclic structure based on a solid content: A weight fraction of the alicyclic structure calculated from the feed ratio of the respective starting materials of the aqueous polyurethane resin dispersion was showed. The weight fraction is based on the solid content of the aqueous polyurethane resin dispersion, and calculated by the same method as in the content of the urethane bonds based on a solid content.

(7) Acid value: It was measured in accordance with the indicator titration method of JIS K 1557. However, to remove the organic amine used for neutralizing the aqueous polyurethane resin dispersion, the aqueous polyurethane resin dispersion was applied onto a glass plate and dried at a temperature of 60° C. under reduced pressure of 20 mmHg for 24 hours, and the acid value was measured by using a solution obtained by dissolving the resulting coating film in N-methylpyrrolidone (NMP).

(8) Density of cross-linking points: A molar concentration (mol/g) of the cross-linking points was calculated from the feed ratio of the respective starting materials of the aqueous polyurethane resin dispersion, and it was showed as the density of the cross-linking points.

(9) Weight average molecular weight of the polyurethane resin in the aqueous polyurethane resin dispersion: This is measured by gel permeation chromatography (GPC), and a conversion value calculated from a calibration curve provisionally prepared by using the standard polystyrenes is mentioned.

(10) Rate of increase in the viscosity at the time of adding 2-ethylhexanol: To 100 g of the aqueous polyurethane resin dispersion was added 3 g of 2-ethylhexanol and the mixture was stirred at 20° C. for 5 minutes. The mixture was allowed to stand at the same temperature for 10 minutes, and then, the viscosity thereof was measured to calculate the rate of increase (%) in the viscosity before and after addition of 2-ethylhexanol.

(11) Swelling rate and dissolution rate of the coating film to water: 0.3 mL of the aqueous polyurethane resin dispersion was applied to a glass plate with a thickness of 0.2 mm, and dried under heating at 40° C. until the concentration of the solid content of the coating film became 90±1% by weight. This coating film was dipped in deionized water at 27° C. for 8 hours, and weights of the coating film before and after dipping were measured. The coating film after dipping was further dried at 140° C. for 4 hours, and the weight of the coating film was measured. The swelling rate and the dissolution rate of the coating film to water were calculated from the following formulae. The solid content concentration of the dried coating film was calculated by the same method as in the content of the urethane bonds based on a solid content.

(Concentration of the solid content of the coating film)=(Weight of the coating film after coating)×(Solid content concentration)/(Weight of the coating film after dried under heating at 40° C.)×100

(Swelling rate)=[(Weight of the coating film after dipping into water)−(Weight of the coating film before dipping into water)]/(Weight of the coating film before dipping into water)×100

(Dissolution rate)=[(Weight of the coating film after coating)×(Solid content concentration)−(Weight of the coating film dried at 140° C. after dipping into water)]/[(Weight of the coating film after coating)×(Solid content concentration)]×100

(12) Swelling rate and dissolution rate of the coating film to aqueous washing solution: Aqueous washing solution containing 5%, 4%, 1% and 90% of butyl cellosolve, isopropanol, dimethylethanolamine and deionized water based on the weight basis respectively, was prepared. 0.3 ml of the aqueous polyurethane resin dispersion was applied to a glass plate with a thickness of 0.2 mm, and dried under heating at 40° C. until the concentration of the solid content of the coating film became 90%. The coating film was dipped into an aqueous washing solution at 27° C. for 3 minutes, and weights of the coating film before and after dipping were measured. The coating film after dipping was further dried at 140° C. for 4 hours, and the weight of the coating film was measured. The swelling rate and the dissolution rate of the coating film to the aqueous washing solution were calculated from the following formulae. The solid content concentration of the dried coating film was calculated by the same method as in the content of the urethane bonds based on a solid content.

(Swelling rate)=[(Weight of the coating film after dipping into aqueous washing solution)−(Weight of the coating film before dipping into aqueous washing solution)]/(Weight of the coating film before dipping into aqueous washing solution)×100

(Dissolution rate)=[(Weight of the coating film after coating)×(Solid content concentration)−(Weight of the coating film dried at 140° C. after dipping into aqueous washing solution)]/[(Weight of the coating film after coating)×(Solid content concentration)]×100

(13) Modulus of elasticity, tensile strength and elongation at break of a polyurethane resin film: measured by the methods in accordance with HS K 7311. Incidentally, the measurement conditions were made a measurement temperature of 23° C., a humidity of 50%, and a tensile speed of 100 mm/min.
(14) Breaking energy: A stress from an elongation of zero of an elongation-stress curve to elongation at break was obtained by integration.
(15) Adhesiveness to the electrodeposition coating surface was evaluated as follows. The aqueous polyurethane resin dispersion was applied to a cation electrodeposition coating plate (manufactured by Nippon Testpanel Co., Ltd.) of an automobile steel sheet by a bar coater, and dried under heating at 60° C. for 30 minutes and at 140° C. for 60 minutes. By using the obtained coating film (thickness: 20 μm), a cross-cut peeling test was carried out. To the coating film was cut in the area of 5 mm×5 mm at intervals of 1 mm in length and breadth, and an adhesive tape was pasted thereon and peeled off, a number of squares remained at the surface of the electrodeposition layer was counted by naked eyes and evaluated. When 15 squares were remained among 25 squares, it was described as 15/25.

Example 1

Preparation of Aqueous Polyurethane Resin Dispersion (1)

In a reaction vessel equipped with a stirrer, a reflux condenser and a thermometer were charged 301 g of ETERNACOLL UH-200 (registered trade mark; polycarbonate diol available from Ube Industries, Ltd.; the number average molecular weight: 1980; the hydroxyl value: 56.8 mg KOH/g; a polycarbonate diol obtained by reacting 1,6-hexanediol and dimethyl carbonate), 20.9 g of 2,2-dimethylolpropionic acid (DMPA) and 152 g of N-methylpyrrolidone (NMP) under nitrogen stream. Thereafter, the mixture was stirred under heating at 60° C. and dissolution of DMPA was confirmed. To the mixture were added 140 g of 4,4'-dicyclohexylmethane diisocyanate (hydrogenated MDI) and 0.37 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.67% by weight. The reaction mixture was cooled to 80° C., 15.4 g of triethylamine was added to the mixture followed by stirring, and 585 g of the mixture was drawn out therefrom and added to 860 g of water under vigorous stirring. Then, a chain extension reaction was carried out by adding 33.9 g of 35% by weight of an aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (1) are shown in Table 1. A rate of increase in the viscosity at the time of adding 2-ethylhexanol, and swelling rates of the coating film to water and an aqueous washing solution of Aqueous polyurethane resin dispersion (1) are shown in Table 2.

Preparation of Polyurethane Film (A)

The aqueous polyurethane resin dispersion (1) was applied to a glass plate as a coating composition, and dried at 60° C. for 2 hours and at 120° C. for 2 hours to obtain a good coating layer. The obtained coating layer was peeled off to prepare a polyurethane film (A). A film thickness of the obtained polyurethane film (A) was 0.08 mm, and tensile characteristics thereof are shown in Table 2.

Example 2

Preparation of Aqueous Polyurethane Resin Dispersion (2)

In a reaction vessel similar to that of Example 1 were charged 261 g of ETERNACOLL UH-200 (registered trade mark; a polycarbonate diol available from Ube Industries, Ltd.; the number average molecular weight: 2000; the hydroxyl value: 56.1 mg KOH/g; a polycarbonate diol obtained by reacting 1,6-hexanediol and dimethyl carbonate), 13.3 g of 2,2-dimethylolpropionic acid (DMPA) and 124 g of N-methylpyrrolidone (NMP) under nitrogen stream. Thereafter, the mixture was stirred under heating at 60° C. and dissolution of DMPA was confirmed. To the mixture were added 104 g of 4,4'-dicyclohexylmethane diisocyanate (hydrogenated MDI) and 0.35 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.44% by weight. The reaction mixture was cooled to 80° C., 12.0 g of triethylamine was added to the mixture followed by stirring, and 475 g of the mixture was drawn out therefrom and added to 713 g of water under vigorous stirring. Then, a chain extension reaction was carried out by adding 25.1 g of 35% by weight of an aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (2) are shown in Table 1. A rate of increase in the viscosity at the time of adding 2-ethylhexanol, and swelling rates of the coating film to water and an aqueous washing solution of Aqueous polyurethane resin dispersion (2) are shown in Table 2.

Preparation of Polyurethane Film (B)

Aqueous polyurethane resin dispersion (2) was applied to a glass plate as a coating composition, and dried at 60° C. for 2 hours and at 120° C. for 2 hours to obtain a good coating layer. The obtained coating layer was peeled off to prepare a polyurethane film (B). A film thickness of the obtained polyurethane film (B) was 0.08 mm, and tensile characteristics thereof are shown in Table 2.

Example 3

Preparation of Aqueous Polyurethane Resin Dispersion (3)

In a reaction vessel similar to that of Example 1 were charged 341 g of ETERNACOLL UH-300 (registered trade mark; a polycarbonate diol available from Ube Industries, Ltd.; the number average molecular weight: 2950; the hydroxyl value: 38.1 mg KOH/g; a polycarbonate diol obtained by reacting 1,6-hexanediol and dimethyl carbonate), 16.0 g of 2,2-dimethylolpropionic acid (DMPA) and 197 g of N-methylpyrrolidone (NMP) under nitrogen stream. Thereafter, the mixture was stirred under heating at 60° C. and dissolution of DMPA was confirmed. To the mixture were added 109 g of 4,4'-dicyclohexylmethane diisocyanate (hydrogenated MDI) and 0.39 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.00% by weight. The reaction mixture was cooled to 80° C., 123 g of triethylamine was added to the mixture followed by stirring, and 639 g of the mixture was drawn out therefrom and added to 827 g of water under vigorous stirring. A chain extension reaction was carried out by adding 26.8 g of 35% by weight of an aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (3) are shown in Table 1. A rate of increase in the viscosity at the time of adding 2-ethylhexanol, and swelling rates of the coating film to water and an aqueous washing solution of Aqueous polyurethane resin dispersion (3) are shown in Table 2.

Preparation of Polyurethane Film (C)

Aqueous polyurethane resin dispersion (3) was applied to a glass plate as a coating composition, and dried at 60° C. for 2 hours and at 120° C. for 2 hours to obtain a good coating layer. The obtained coating layer was peeled off to prepare a polyurethane film (C). A film thickness of the obtained polyurethane film (C) was 0.08 mm, and tensile characteristics thereof are shown in Table 2.

Example 4

Preparation of Aqueous Polyurethane Resin Dispersion (4)

In a reaction vessel similar to that of Example 1 were charged 310 g of ETERNACOLL UH-200 (registered trade mark; a polycarbonate diol available from Ube Industries, Ltd.; the number average molecular weight: 1980; the hydroxyl value: 56.8 mg KOH/g; a polycarbonate diol obtained by reacting 1,6-hexanediol and dimethyl carbonate), 16.6 g of 2,2-dimethylolpropionic acid (DMPA) and 156 g of N-methylpyrrolidone (NMP) under nitrogen stream. Thereafter, the mixture was stirred under heating at 60° C. and dissolution of DMPA was confirmed. To the mixture were added 143 g of 4,4'-dicyclohexylmethane diisocyanate (hydrogenated MDI) and 0.38 g of dibutyl tin dilaurate (catalyst), the resulting mixture was heated to 90° C., and urethanization reaction was carried out over 5 hours. Thereafter, 2.75 g of trimethylolpropane (TMP) was injected to the mixture, and stirring was continued at the same temperature for 2 hours to obtain a polyurethane prepolymer. A content of the free isocyanato group at the time of completion of the urethanization reaction was 2.80% by weight. The reaction mixture was cooled to 80° C., 12.3 g of triethylamine was added to the mixture followed by stirring, and 596 g of the mixture was drawn out therefrom and added to 887 g of water under vigorous stirring. A chain extension reaction was carried out by adding 32.4 g of 34% by weight aqueous amine solution to which 1.56 g of hydrazine and 9.43 g of diethylenetriamine had been mixed to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (4) are shown in Table 1. A rate of increase in the viscosity at the time of adding 2-ethylhexanol, and swelling rates of the coating film to water and an aqueous washing solution of Aqueous polyurethane resin dispersion (4), are shown in Table 2.

Preparation of Polyurethane Film (D)

Aqueous polyurethane resin dispersion (4) was applied to a glass plate as a coating composition, and dried at 60° C. for 2 hours and at 120° C. for 2 hours to obtain a good coating layer. The obtained coating layer was peeled off to prepare a polyurethane film (D). A film thickness of the obtained polyurethane film (D) was 0.08 mm, and tensile characteristics thereof are shown in Table 2.

Example 5

Preparation of Aqueous Polyurethane Resin Dispersion (5)

In a reaction vessel similar to that of Example 1 were charged 260 g of ETERNACOLL UH-200 (registered trade mark; a polycarbonate diol available from Ube Industries, Ltd.; the number average molecular weight: 2030; the hydroxyl value: 55.2 mg KOH/g; a polycarbonate diol obtained by reacting 1,6-hexanediol and dimethyl carbonate), 13.5 g of 2,2-dimethylolpropionic acid (DMPA) and 127 g of N-methylpyrrolidone (NMP) under nitrogen stream. Thereafter, the mixture was stirred under heating at 60° C. and dissolution of DMPA was confirmed. To the mixture were added 105 g of 4,4'-dicyclohexylmethane diisocyanate (hydrogenated MDI) and 0.30 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.56% by weight. The reaction mixture was cooled to 80° C., 10.1 g of triethylamine and 3.47 g of DURANATE TLA100 (registered trade mark; isocyanurate available from Asahi Kasei Chemicals Corporation; 1,6-hexamethylene diisocyanate trimer) were added to the mixture followed by stirring, 475 g of the mixture was drawn out therefrom and added to 713 g of water under vigorous stirring. Then, a chain extension reaction was carried out by adding 26.5 g of 35% by weight of an aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (5) are shown in Table 1. A rate of increase in the viscosity at the time of adding 2-ethylhexanol, and swelling rates of the coating film to water and an aqueous washing solution of Aqueous polyurethane resin dispersion (5) are shown in Table 2.

Preparation of Polyurethane Film (E)

Aqueous polyurethane resin dispersion (5) was applied to a glass plate as a coating composition, and dried at 60° C. for 2 hours and at 120° C. for 2 hours to obtain a good coating layer. The obtained coating layer was peeled off to prepare a polyurethane film (E). A film thickness of the obtained polyurethane film (E) was 0.08 mm, and tensile characteristics thereof are shown in Table 2.

Example 6

Preparation of Aqueous Polyurethane Resin Dispersion (6)

In a reaction vessel similar to that of Example 1 were charged 320 g of ETERNACOLL UH-200 (registered trade mark; a polycarbonate diol available from Ube Industries, Ltd.; the number average molecular weight: 2060; the hydroxyl value: 54.5 mg KOH/g; a polycarbonate diol obtained by reacting 1,6-hexanediol and dimethyl carbonate), 16.4 g of 2,2-dimethylolpropionic acid (DMPA) and 154 g of N-methylpyrrolidone (NMP) under nitrogen stream. Thereafter, the mixture was stirred under heating at 60° C. and dissolution of DMPA was confirmed. To the mixture were added 122 g of 4,4'-dicyclohexylmethane diisocyanate (hydrogenated MDI) and 0.40 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.46% by weight. The reaction mixture was cooled to 80° C., 12.3 g of triethylamine was added to the mixture followed by stirring, and 588 g of the mixture was drawn out therefrom and added to a mixed solution of 4.30 g of triethylamine and 845 g of water under vigorous stirring. Then, a chain extension reaction was carried out by adding 35.8 g of 35% by weight aqueous triethylenetetramine solution (available from TOSOH CORPORATION; amine value: 1440 mg KOH/g) to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (6) are shown in Table 1. A rate of increase in the viscosity at the time of adding 2-ethylhexanol, and swelling rates of the coating film to water and an aqueous washing solution of Aqueous polyurethane resin dispersion (6) are shown in Table 2.

Preparation of Polyurethane Film (F)

Aqueous polyurethane resin dispersion (6) was applied to a glass plate as a coating composition, and dried at 60° C. for 2 hours and at 120° C. for 2 hours to obtain a good coating layer. The obtained coating layer was peeled off to prepare a polyurethane film (F). A film thickness of the obtained polyurethane film (F) was 0.08 mm, and tensile characteristics thereof are shown in Table 2.

Comparative Example 1

Preparation of Aqueous Polyurethane Resin Dispersion (6)

In a reaction vessel similar to that of Example 1 were charged 301 g of ETERNACOLL UH-200 (registered trade mark; a polycarbonate diol available from Ube Industries, Ltd.; the number average molecular weight: 1990; the hydroxyl value: 56.4 mg KOH/g; a polycarbonate diol obtained by reacting 1,6-hexanediol and dimethyl carbonate), 20.4 g of 2,2-dimethyloipropionic acid (DMPA) and 153 g of N-methylpyrrolidone (NMP) under nitrogen stream. Thereafter, the mixture was stirred under heating at 60° C. and dissolution of DMPA was confirmed. To the mixture were added 139 g of 4,4'-dicyclohexylmethane diisocyanate (hydrogenated MDI) and 0.36 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.75% by weight. The reaction mixture was cooled to 80° C., 15.4 g of triethylamine was added to the mixture followed by stirring, and 584 g of the mixture was drawn out therefrom and added to 838 g of water under vigorous stirring. Then, a chain extension reaction was carried out by adding 58.3 g of 35% by weight aqueous 2-methyl-1,5-diaminopentane solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (6) are shown in Table 1. A rate of increase in the viscosity at the time of adding 2-ethylhexanol, and swelling rates of the coating film to water and an aqueous washing solution of Aqueous polyurethane resin dispersion (6) are shown in Table 2.

Preparation of Polyurethane Film (F)

Aqueous polyurethane resin dispersion (6) was applied to a glass plate as a coating composition, and dried at 60° C. for 2 hours and 120° C. for 2 hours to obtain a good coating layer. The obtained coating layer was peeled off to prepare a polyurethane film (F). A film thickness of the obtained polyurethane film (F) was 0.08 mm, and tensile characteristics thereof are shown in Table 2.

Comparative Example 2

Preparation of Aqueous Polyurethane Resin Dispersion (7)

In a reaction vessel similar to that of Example 1 were charged 270 g of ETERNACOLL PH-200D (registered trade mark; a polycarbonate diol available from Ube Industries, Ltd.; the number average molecular weight: 1980; the hydroxyl value: 56.6 mg KOH/g; a polycarbonatediol obtained by reacting 1,6-hexanediol and 1,5-pentanediol (molar ratio: 1:1) with dimethyl carbonate), 30.0 g of polypropylene glycol (reagent of Wako Pure Chemical Industries, Ltd.; PPG-1000; the number average molecular weight: 1000), 15.5 g of 2,2-dimethylolpropionic acid (DMPA) and 145 g of N-methylpyrrolidone (NMP) under nitrogen stream. Thereafter, the mixture was stirred under heating at 60° C. and dissolution of DMPA was confirmed. To the mixture were added 125 g of 4,4'-dicyclohexylmethane diisocyanate (hydrogenated MDI) and 0.38 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.71% by weight. The reaction mixture was cooled to 80° C., 11.4 g of triethylamine was added to the mixture followed by stirring, and 555 g of the mixture was drawn out therefrom and added to a mixed solution of 3.45 g of triethylamine and 804 g of water under vigorous stirring. Then, a chain extension reaction was carried out by adding 23.5 g of 35% by weight aqueous amine solution in which 2.63 g of hydrazine monohydrate and 5.58 g of diethylenetriamine have been mixed to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (7) are shown in Table 1. A rate of increase in the viscosity at the time of adding 2-ethylhexanol, and swelling rates of the coating film to water and an aqueous washing solution of Aqueous polyurethane resin dispersion (7) are shown in Table 2.

Preparation of Polyurethane Film (G)

Aqueous polyurethane resin dispersion (7) was applied to a glass plate as a coating composition, and dried at 60° C. for 2 hours and at 120° C. for 2 hours to obtain a good coating layer. The obtained coating layer was peeled off to prepare a polyurethane film (G). A film thickness of the obtained polyurethane film (G) was 0.08 mm, and tensile characteristics thereof are shown in Table 2.

Comparative Example 3

Preparation of Aqueous Polyurethane Resin Dispersion (8)

In a reaction vessel similar to that of Example 1 were charged 315 g of ETERNACOLL UH-50 (registered trade mark; a polycarbonate diol available from Ube Industries, Ltd.; the number average molecular weight: 509; the hydroxyl value: 220 mg KOH/g; a polycarbonate diol obtained by reacting 1,6-hexanediol and dimethyl carbonate), 16.2 g of 2,2-dimethylolpropionic acid (DMPA) and 146 g of N-methylpyrrolidone (NMP) under nitrogen stream. Thereafter, the mixture was stirred under heating at 60° C. and dissolution of DMPA was confirmed. To the mixture were added 246 g of 4,4'-dicyclohexylmethane diisocyanate (hydrogenated MDI) and 0.36 g of dibutyl tin dilaurate (catalyst), the resulting mixture was heated to 90° C., and urethanization reaction was carried out over 5 hours. Thereafter, 8.33 g of trimethylolpropane (TMP) was injected to the mixture, and stirring was continued at the same temperature for 2.5 hours to obtain a polyurethane prepolymer. A content of the free isocyanato group at the time of completion of the urethanization reaction was 5.23% by weight. The reaction mixture was cooled to 80° C., 12.3 g of triethylamine was added to the mixture followed by stirring, and 568 g of the mixture was drawn out therefrom and added to a mixed solution of 4.35 g of triethylamine and 845 g of water under vigorous stirring. Then, a chain extension reaction was carried out by adding 63.9 g of 35% by weight aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (8) are shown in Table 1. A rate of increase in the viscosity at the time of adding 2-ethylhexanol, and swelling rates of the coating film to water and an aqueous washing solution of Aqueous polyurethane resin dispersion (8) are shown in Table 2.

Preparation of Polyurethane Film (H)

Aqueous polyurethane resin dispersion (8) was applied to a glass plate as a coating composition, and dried at 60° C. for 2 hours and at 120° C. for 2 hours to obtain a good coating layer. The obtained coating layer was peeled off to prepare a polyurethane film (H). A film thickness of the obtained polyurethane film (H) was 0.08 mm, and tensile characteristics thereof are shown in Table 2.

Comparative Example 4

Preparation of Aqueous Polyurethane Resin Dispersion (9)

In a reaction vessel similar to that of Example 1 were charged 310 g of ETERNACOLL 3040 (registered trade mark; a polyester polyol available from Ube Industries, Ltd.; the number average molecular weight: 1990; the hydroxyl value: 56.3 mg KOH/g; a polyester polyol obtained by reacting 1,6-hexanediol and adipic acid), 15.6 g of 2,2-dimethylolpropionic acid (DMPA) and 149 g of N-methylpyrrolidone (NMP) under nitrogen stream. Thereafter, the mixture was stirred under heating at 60° C. and dissolution of DMPA was confirmed. To the mixture were added 119 g of 4,4'-dicyclohexylmethane diisocyanate (hydrogenated MDI) and 0.37 g of dibutyl tin dilaurate (catalyst), the resulting mixture was heated to 90° C., and urethanization reaction was carried out over 5 hours to obtain a polyurethane prepolymer. A content of the free isocyanato group at the time of completion of the urethanization reaction was 2.56% by weight. The reaction mixture was cooled to 80° C., 12.8 g of triethylamine was added to the mixture followed by stirring, and 571 g of the mixture was drawn out therefrom and added to 841 g of water under vigorous stirring. Then, a chain extension reaction was carried out by adding 31.3 g of 35% by weight aqueous diethylenetriamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (9) are shown in Table 1. A rate of increase in the viscosity at the time of adding 2-ethylhexanol, and swelling rates of the coating film to water and an aqueous washing solution of Aqueous polyurethane resin dispersion (9) are shown in Table 2.

Preparation of Polyurethane Film (I)

Aqueous polyurethane resin dispersion (9) was applied to a glass plate as a coating composition, and dried at 60° C. for 2 hours and at 120° C. for 2 hours to obtain a good coating layer. The obtained coating layer was peeled off to prepare a polyurethane film (I). A film thickness of the obtained polyurethane film (I) was 0.08 mm, and tensile characteristics thereof are shown in Table 2.

Comparative Example 5

Preparation of Aqueous Polyurethane Resin Dispersion (10)

In a reaction vessel similar to that of Example 1 were charged 272 g of ETERNACOLL UH-200 (registered trade mark; a polycarbonate diol available from Ube Industries, Ltd.; the number average molecular weight: 2000; the hydroxyl value: 56.1 mg KOH/g; a polycarbonate diol obtained by reacting 1,6-hexanediol and dimethyl carbonate), 18.5 g of 2,2-dimethylolpropionic acid (DMPA) and 176 g of N-methylpyrrolidone (NMP) under nitrogen stream. To the mixture were added 125 g of 4,4'-dicyclohexylmethane diisocyanate (hydrogenated MDI) and 0.33 g of dibutyl tin dilaurate (catalyst), the resulting mixture was heated to 90° C., and urethanization reaction was carried out over 5 hours. Thereafter, 10.4 g of 3,5-dimethylpyrazole (DMPZ) was injected to the mixture, and stirring was continued at the same temperature for 1.5 hours to obtain a polyurethane prepolymer. A content of the free isocyanato group at the time of completion of the urethanization reaction was 1.78% by weight. To the reaction mixture was added 13.9 g of triethylamine followed by stirring, 564 g of the mixture was drawn out therefrom and added to 870 g of water under vigorous stirring. Then, a chain extension reaction was carried out by adding 36.5 g of 35% by weight aqueous 2-methyl-1,5-pentanediamine solution to obtain an aqueous polyurethane resin dispersion. A content of the urethane bonds, a content of the urea bonds, a content of the carbonate bonds, a content of the ether bonds, a content of the ester bonds, a density of cross-linking points, an acid value, a weight average molecular weight and a content of the alicyclic structure of the obtained Aqueous polyurethane resin dispersion (10) are shown in Table 1. A rate of increase in the viscosity at the time of adding 2-ethylhexanol, and swelling rates of the coating film to water and an aqueous washing solution of Aqueous polyurethane resin dispersion (10) are shown in Table 2.

Preparation of Polyurethane Film (J)

Aqueous polyurethane resin dispersion (10) was applied to a glass plate as a coating composition, and dried at 60° C. for 2 hours and at 120° C. for 2 hours to obtain a good coating layer. The obtained coating layer was peeled off to prepare a polyurethane film (J). A film thickness of the obtained polyurethane film (J) was 0.08 mm, and tensile characteristics thereof are shown in Table 2.

In Table 1, each abbreviated term means as follows.
DETA: diethylenetriamine
TETA: triethylenetetramine
MPDA: 2-methyl-1,5-pentanediamine
HZ: hydrazine monohydrate
UH-200: ETERNACOLL UH-200 (available from Ube Industries, Ltd.)
UH-300: ETERNACOLL UH-300 (available from Ube Industries, Ltd.)
TMP: trimethylolpropane
PH-200: ETERNACOLL PH-200 (available from Ube Industries, Ltd.)
PPG1000: polypropylene glycol (the number average molecular weight=1000)
UH-50: ETERNACOLL UH-50 (available from Ube Industries, Ltd.)
ET-3040: ETERNACOLL 3040 (available from Ube Industries, Ltd.)

Also, in Table 2, "*" means that there are cracks in the coating film so that the tensile test, etc., could not be carried out.

TABLE 1

| | Component (B) | Component (b) | Content of urethane bonds [% by weight] | Content of urea bonds [% by weight] | Content of carbonate bonds [% by weight] | Content of ether bonds [% by weight] | Content of ester bonds [% by weight] | Density of cross-linking points ($\times 10^{-4}$) [mol] | Acid value [mgKOH/g] | Weight average molecular weight (Mw) | Content of alicyclic structure [% by weight] |
|---|---|---|---|---|---|---|---|---|---|---|---|
| Example 1 | DETA | UH-200 | 7.7 | 4.7 | 25.5 | 0.0 | 0.0 | 2.7 | 18 | >350,000 | 17.7 |
| Example 2 | DETA | UH-200 | 7.1 | 4.3 | 26.7 | 0.0 | 0.0 | 2.5 | 14 | >350,000 | 16.2 |
| Example 3 | DETA | UH-300 | 6.0 | 3.6 | 29.0 | 0.0 | 0.0 | 2.1 | 14 | >350,000 | 13.6 |
| Example 4 | DETA | UH-200/TMP | 7.7 | 4.3 | 26.0 | 0.0 | 0.0 | 2.5 | 14 | >350,000 | 17.1 |
| Example 5 | DETA | UH-200 | 6.9 | 5.1 | 26.7 | 0.0 | 0.0 | 3.0 | 14 | >350,000 | 17.8 |
| Example 6 | TETA | UH-200 | 7.0 | 4.2 | 26.7 | 0.0 | 0.0 | 7.6 | 14 | >350,000 | 16.0 |
| Comparative example 1 | MPDA | UH-200 | 7.5 | 4.6 | 24.6 | 0.0 | 0.0 | 0.0 | 18 | 165,000 | 17.6 |
| Comparative example 2 | HZ/DETA | PH-200/PPG1000 | 7.4 | 4.5 | 25.1 | 1.8 | 0.0 | 1.3 | 14 | >350,000 | 17.0 |
| Comparative example 3 | DETA | UH-50/TMP | 14.8 | 7.7 | 12.4 | 0.0 | 0.0 | 6.3 | 14 | >350,000 | 32.7 |
| Comparative example 4 | DETA | ET-3040 | 7.1 | 4.3 | 0.0 | 0.0 | 23.0 | 2.5 | 14 | >350,000 | 16.2 |
| Comparative example5 | MPDA | UH-200 | 7.6 | 3.2 | 25.1 | 0.0 | 0.0 | 0.0 | 18 | 40,000 | 18.3 |

TABLE 2

| | Rate of increase in the viscosity at the time of adding 2-ethylhexanol [%] | To water | | To aqueous washing solution | | Tensile characteristics | | | | Adhesiveness to electrodeposition coating surface (cross-cut peeling) |
| | | Swelling rate [%] | Dissolution rate [%] | Swelling rate [%] | Dissolution rate [%] | Modulus of elasticity [MPa] | Tensile strength [MPa] | Elongation at break [%] | Breaking energy [MPa] | |
|---|---|---|---|---|---|---|---|---|---|---|
| Example 1 | 95 | 19 | 0 | 47 | 16 | 240 | 31 | 210 | 39 | 25/25 |
| Example 2 | 120 | 17 | 0 | 63 | 33 | 220 | 30 | 210 | 33 | 25/25 |
| Example 3 | 148 | 11 | 0 | 35 | 4 | 160 | 27 | 260 | 33 | 25/25 |
| Example 4 | 67 | 5 | 0 | 26 | 0 | 290 | 33 | 200 | 52 | 25/25 |
| Example 5 | 63 | 10 | 0 | 30 | 0 | 220 | 12 | 80 | 10 | 10/25 |
| Example 6 | 39 | 19 | 0 | 42 | 2 | 215 | 17 | 140 | 20 | 13/25 |
| Comparative example 1 | 172 | 16 | 0 | 4 | 0 | 150 | 63 | 500 | 171 | 25/25 |
| Comparative example 2 | 198 | 15 | 0 | 18 | 0 | 150 | 49 | 400 | 96 | 25/25 |
| Comparative example 3 | 62 | 4 | 0 | 11 | 0 | * | * | * | * | * |
| Comparative example 4 | 140 | 40 | 0 | 46 | 0 | 160 | 26 | 320 | 43 | 25/25 |
| Comparative example 5 | 255 | 8 | 0 | 39 | 0 | 45 | 51 | 450 | 96 | 25/25 |

The respective aqueous polyurethane resin dispersions of Examples were small in the rate of increase in the viscosity at the time of adding 2-ethylhexanol, so that handling property and storage stability in the co-presence of the non-aqueous organic solvent are good. Further, the coating films (solid content concentration: 90±1%) formed by the respective aqueous polyurethane resin dispersions of Examples had low swelling rate and dissolution rate to water, so that they were excellent in water resistance. Also, these coating films each show high swelling rate to the aqueous washing solution, and it can be understood that repainting is possible. On the other hand, Comparative examples 1 and 2 and Comparative example 5 are inferior to Examples in the point of storage stability in the co-presence of the non-aqueous organic solvent, and whereas Comparative example 3 is excellent in storage stability, breaking energy at tension of the coating film is small so that its impact resistance is poor. Comparative example 4 showed high swelling rate to water of the coating film (solid content concentration: 90±1%), so that its water resistance is poor.

In particular, by making the aqueous polyurethane resin dispersion with the density of the cross-linking points of the polyurethane resin of $3.0 \times 10^{-4}$ to $8.0 \times 10^{-4}$ mol/g, preferably $3.0 \times 10^{-4}$ to $7.6 \times 10^{-4}$ mol/g, a rate of increase in the viscosity of the aqueous polyurethane resin dispersion when the non-aqueous organic solvent is added can be further lowered.

Also, a polycarbonate diol alone is used as (b) the polyol compound, the swelling rate to the aqueous washing solution can be heightened while suppressing the swelling rate to water to a low degree, whereby repainting can be carried out after coating the aqueous polyurethane resin dispersion to a substrate, etc., by washing or peeling the coating film with a washing solution.

On the other hand, by making the density of the cross-linking points of the polyurethane resin $2.0 \times 10^{-4}$ to $2.9 \times 10^{-4}$ mol/g, and preferably $2.1 \times 10^{-4}$ to $2.7 \times 10^{-4}$ mol/g, the coating film having high breaking energy can be formed, and the coating film which is difficultly cracked even when impact is received from the outside can be obtained. Also, it has extremely high adhesiveness to the surface of the electrodeposition coating film, it is useful for a coating agent of a steel frame or a piping, a paint coating on an electrodeposition coating film, and a starting materials thereof.

Utilizability In Industry

The aqueous polyurethane resin dispersion of the present invention can be widely utilized as a starting material of a paint or a coating agent, etc. Also, the polyurethane resin film of the present invention can be utilized as a decoration film.

The invention claimed is:

1. An aqueous polyurethane resin dispersion in which a polyurethane resin is dispersed in an aqueous medium, wherein
   the polyurethane resin is obtained by reacting (A) a polyurethane prepolymer which is obtained by reacting (a) a polyisocyanate compound, (b) a polyol compound containing a polycarbonate polyol having a number average molecular weight of 800 to 3500, and (c) an acidic group-containing polyol compound, and (B) a chain extender,
   (B) the chain extender contains a polyamine compound having three or more in total of an amino group(s) and/or an imino group(s) per molecule, and
   the polyurethane resin has, each based on a solid content, a content of urethane bonds of 5 to 10% by weight, a content of urea bonds of 2 to 7% by weight, a content of carbonate bonds of 15 to 40% by weight, has neither ether bond nor ester bond, has a density of cross-linking points of $1.0 \times 10^{-4}$ to $1.0 \times 10^{-3}$ mol/g, an acid value of 12 to 20 mg KOH/g, and a weight average molecular weight of 100,000 or more.

2. The aqueous polyurethane resin dispersion according to claim 1, wherein the polyurethane resin contains an alicyclic structure, and a content of the alicyclic structure is 10 to 40% by weight based on a solid content.

3. The aqueous polyurethane resin dispersion according to claim 1, wherein (a) the polyisocyanate compound is a polyisocyanate compound having no allophanate bond.

4. The aqueous polyurethane resin dispersion according to claim 1, wherein (a) the polyisocyanate compound contains an alicyclic diisocyanate.

5. The aqueous polyurethane resin dispersion according to claim 1, wherein the (a) the polyisocyanate compound contains 80 mol % or more of 4,4'-dicyclohexylmethane diisocyanate.

6. The aqueous polyurethane resin dispersion according to claim 1, wherein (B) the chain extender contains a polyamine compound having two $NH_2$ groups and one or more NH groups per molecule.

7. The aqueous polyurethane resin dispersion according to claim 1, wherein (b) the polyol compound contains a polyfunctional alcohol having three or more hydroxyl groups per molecule in an amount of 10 mol % or more and less than 50 mol %.

8. The aqueous polyurethane resin dispersion according to claim 1, wherein the dispersion can be obtained by subjecting a reaction of (A) the polyurethane prepolymer and (B) the chain extender in the presence of a polyfunctional isocyanate compound having three or more isocyanato groups per molecule.

9. A coating composition comprising the aqueous polyurethane resin dispersion according to claim 1.

10. The coating composition according to claim 9, wherein the composition further comprises a non-aqueous organic solvent.

11. A polyurethane resin film obtained by applying a composition comprising the aqueous polyurethane resin dispersion according to claim 1 to a substrate, and drying under heating.

12. The aqueous polyurethane resin dispersion according to claim 2, wherein (a) the polyisocyanate compound is a polyisocyanate compound having no allophanate bond.

13. The aqueous polyurethane resin dispersion according to claim 2, wherein (a) the polyisocyanate compound contains an alicyclic diisocyanate.

14. The aqueous polyurethane resin dispersion according to claim 3, wherein (a) the polyisocyanate compound contains an alicyclic diisocyanate.

15. The aqueous polyurethane resin dispersion according to claim 2, wherein the (a) the polyisocyanate compound contains 80 mol % or more of 4,4'-dicyclohexylmethane diisocyanate.

16. The aqueous polyurethane resin dispersion according to claim 3, wherein the (a) the polyisocyanate compound contains 80 mol % or more of 4,4'-dicyclohexylmethane diisocyanate.

17. The aqueous polyurethane resin dispersion according to claim 4, wherein the (a) the polyisocyanate compound contains 80 mol % or more of 4,4'-dicyclohexylmethane diisocyanate.

18. The aqueous polyurethane resin dispersion according to claim 2, wherein (B) the chain extender contains a polyamine compound having two $NH_2$ groups and one or more NH groups per molecule.

19. The aqueous polyurethane resin dispersion according to claim 3, wherein (B) the chain extender contains a polyamine compound having two $NH_2$ groups and one or more NH groups per molecule.

20. The aqueous polyurethane resin dispersion according to claim 4, wherein (B) the chain extender contains a polyamine compound having two $NH_2$ groups and one or more NH groups per molecule.

* * * * *